United States Patent
Vedula et al.

(10) Patent No.: US 10,171,984 B2
(45) Date of Patent: Jan. 1, 2019

(54) METHOD AND DEVICE FOR ENABLING VIRTUAL DOCKING IN A WIRELESS NETWORK

(71) Applicant: Samsung Electronics Co., Ltd., Gyeonggi-do (KR)

(72) Inventors: Kiran Bharadwaj Vedula, Bangalore (IN); Jong-Hyo Lee, Gyeonggi-do (KR); Jun-Hyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/648,432

(22) PCT Filed: Nov. 6, 2013

(86) PCT No.: PCT/KR2013/010007
§ 371 (c)(1),
(2) Date: May 29, 2015

(87) PCT Pub. No.: WO2014/084517
PCT Pub. Date: Jun. 5, 2014

(65) Prior Publication Data
US 2015/0319598 A1    Nov. 5, 2015

(30) Foreign Application Priority Data
Nov. 30, 2012   (IN) .......................... 5019/CHE/2012

(51) Int. Cl.
*H04W 8/00*       (2009.01)
*G06F 1/16*       (2006.01)
*H04W 4/80*       (2018.01)

(52) U.S. Cl.
CPC .......... *H04W 8/005* (2013.01); *G06F 1/1632* (2013.01); *H04W 4/80* (2018.02)

(58) Field of Classification Search
CPC ..... H04W 8/005; H04W 84/18; H04W 28/18; H04W 40/246; H04L 67/1061; H04L 67/16; H04L 69/24; H04L 67/104
See application file for complete search history.

(56) References Cited

U.S. PATENT DOCUMENTS

| | | | |
|---|---|---|---|
| 8,416,432 B2 | 4/2013 | Kim | |
| 2007/0136770 A1 | 6/2007 | Kim et al. | |
| 2010/0211698 A1* | 8/2010 | Krishnaswamy | H04W 4/003 710/11 |
| 2012/0099566 A1* | 4/2012 | Laine | H04M 1/7253 370/338 |

(Continued)

FOREIGN PATENT DOCUMENTS

| | | |
|---|---|---|
| KR | 100728019 | 6/2007 |
| KR | 100765768 | 10/2007 |

OTHER PUBLICATIONS

PCT/ISA/210 Search Report issued on PCT/KR2013/010007 (pp. 3)

*Primary Examiner* — Alejandro Rivero
(74) *Attorney, Agent, or Firm* — The Farrell Law Firm, P.C.

(57) ABSTRACT

A method and device to implement virtual docking host functionality in a wireless network is disclosed. The method manages at least one docking environment device within a wireless network. Further, the method discovers at least one docking environment and docks a dockee device to at least one docking environment device.

12 Claims, 3 Drawing Sheets

(56) References Cited

U.S. PATENT DOCUMENTS

2012/0265913 A1* 10/2012 Suumaki ............... H04W 4/08
              710/303
2013/0311692 A1* 11/2013 Huang ................. H04M 1/723
              710/303

* cited by examiner

[Fig. 1]
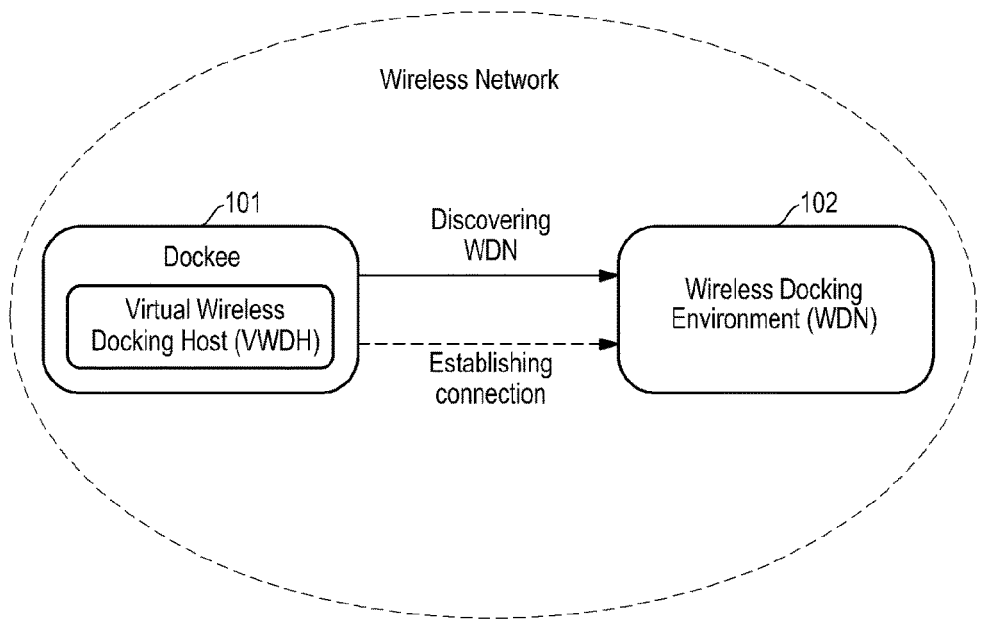
[Fig. 2]
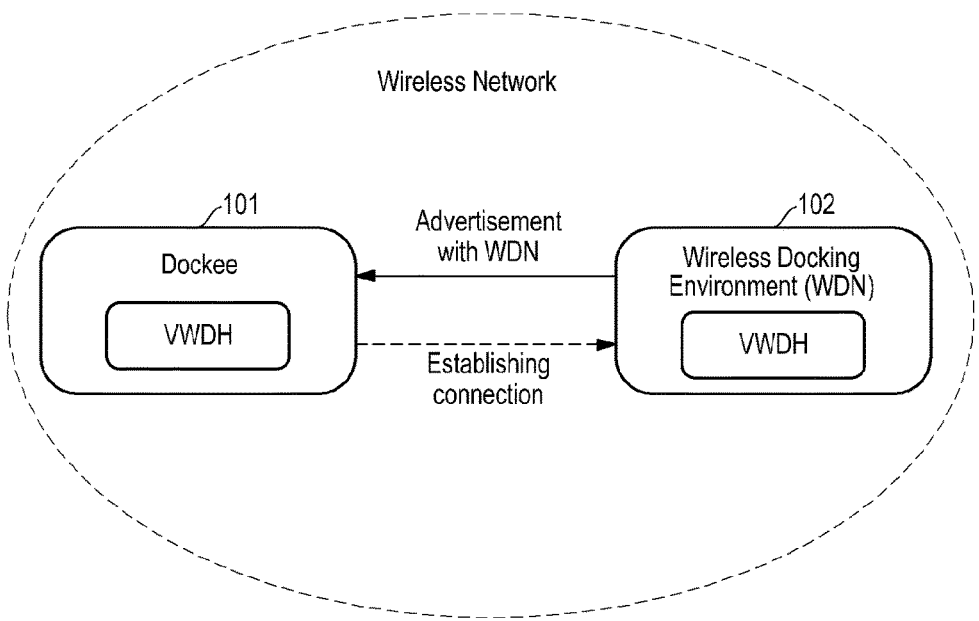

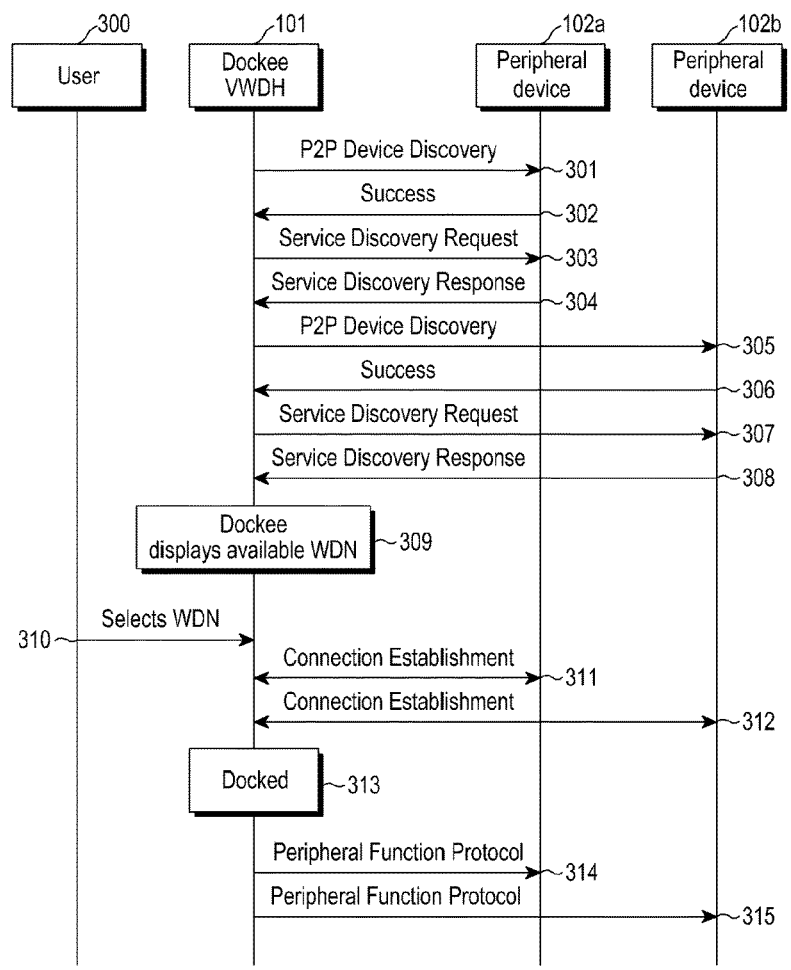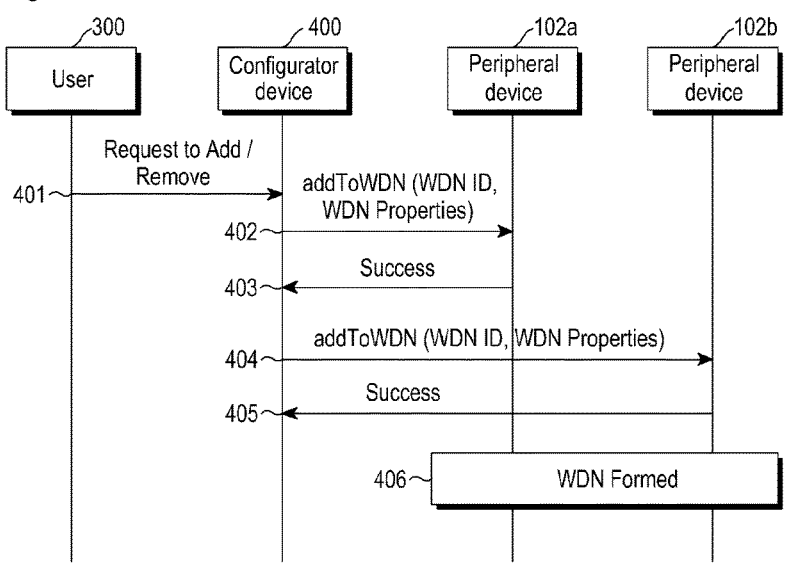

[Fig. 5]
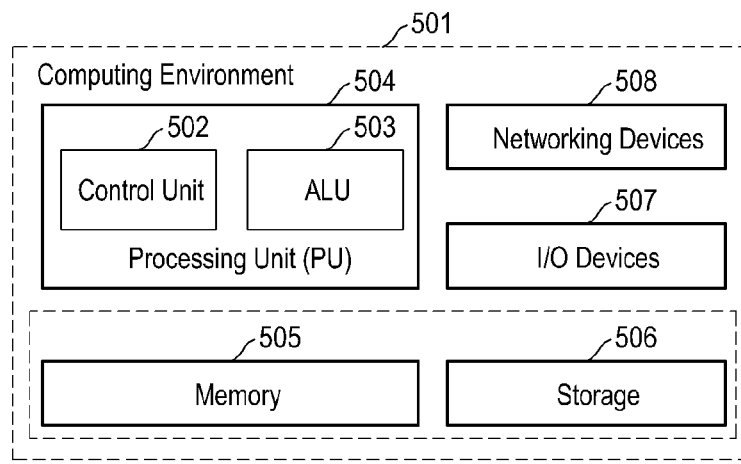

METHOD AND DEVICE FOR ENABLING VIRTUAL DOCKING IN A WIRELESS NETWORK

PRIORITY

This application is a National Phase Entry of PCT International Application No. PCT/KR2013/010007, which was filed on Nov. 6, 2013, and claims priority to Indian Patent Application No. 5019/CHE/2012, which was filed on Nov. 30, 2012, and Indian Patent Application No. 5019/CHE/2012, which was filed on Sep. 26, 2013, the contents of each of which are incorporated herein by reference.

TECHNICAL FIELD

The present invention relates to a docking environment in a wireless network, and more particularly to a method and a device for enabling virtual wireless docking in a wireless network.

BACKGROUND ART

Emergence of wireless technologies replaces hardwired docking station connections with a wireless connection. Current technologies such as ultra-wideband (UWB), Wireless Fidelity (Wi-Fi), Wireless Gigabit Alliance (Wi-Gig) provide solutions to implement a wireless docking station. There are various solutions available in the market to enable wireless connectivity between a hand-held device and its respective peripherals by providing a wireless computer docking system. Specifically, when a user device equipped with a UWB wireless transceiver provides a wireless connection with UWB-enabled peripheral devices without the need for physically connecting to a docking station.

As the number of wireless peripheral devices supported in the wireless network is increasing, there is a need for discovering and connecting the wireless peripheral device to a user device with increased reliability and decreased cost. Having a docking station for connecting the user device with the peripheral device incurs additional cost in setting up the docking environment. Further, as the number of wireless peripheral devices increases in the docking environment, it is difficult for existing docking environment to discover and connect the peripheral device with the user device. Additionally, the existing docking environment requires the wireless peripheral device to be in one or more docking environments depending on the type of docking functionality required within the wireless network.

DISCLOSURE OF INVENTION

Technical Problem

The principal object of the invention herein is to provide a method and device to implement a virtual wireless docking host (VWDH) functionality in a wireless network.

Another object of the invention is to provide a method to manage one or more wireless docking environments (WDNs) in the wireless network.

Another object of the invention is to provide a method to discover one or more WDNs in the wireless network.

Another object of the invention is to provide a method to dock the dockee to one or more WDNs.

Solution to Problem

Accordingly the invention provides a method to implement a virtual wireless docking host (VWDH) functionality in a wireless network, wherein the method comprises discovering, by a dockee, at least one docking environment (WDN) within the wireless network. Further the method comprises docking the dockee to the discovered at least one WDN.

Accordingly the invention provides a dockee device to implement a virtual wireless docking host (VWDH) functionality in a wireless network, wherein the wireless network comprises at least one dockee device, at least one docking environment (WDN) and at least one peripheral device in the at least one WDN. Further the dockee device is configured to discover at least one docking environment (WDN) within the wireless network. Further the dockee device is configured to dock to the discovered at least one WDN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates a system overview to implement a virtual wireless docking host (VWDH) within a dockee in a wireless network, according to embodiments as disclosed herein;

FIG. 2 illustrates the system overview to implement the VWDH partially within the dockee and partially within a WDN, according to embodiments as disclosed herein;

FIG. 3 illustrates a sequence diagram for establishing a connection between the dockee and the WDN, according to embodiments as disclosed herein;

FIG. 4 illustrates a sequence diagram for configuring and managing the WDN in the wireless network, according to embodiments as disclosed herein; and FIG. 5 illustrates a computing environment implementing the virtual wireless docking host (VWDH) in, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and device to implement a virtual wireless docking host (VWDH) functionality within a wireless network to dock to one or more discovered WDNs. The VWDH manages one or more WDNs in the wireless network.

In an embodiment, the VWDH (VWDH functionality) is implemented partially in the dockee and partially in the WDN.

Implementing the VWDH in the dockee reduces the network traffic between the dockee and a physical docking host and avoids the need for having a physical docking host in the wireless network. Further, the VWDH enables the dockee to provide quality of service (QoS) like channel switch based on the channel condition and the like within the wireless network.

In an embodiment, the dockee can be a mobile phone, a laptop, a tablet, a personal computer, a camera, smart phone or any device that is capable of docking with the WDN in the wireless network.

In an embodiment, the WDN includes one or more peripheral devices such as a mouse, a key board, an USB hard drive, a webcam, a display screen, a printer, a scanner and the like. The peripheral device must be capable of docking with the dockee in the WDN.

In an embodiment, a wireless network can be one of: a Wireless Local Area Network (WLAN), a Wireless Metropolitan Area Network (WMAN), a Wireless-Fidelity (Wi-Fi) network and the like.

Referring now to the drawings, and more particularly to FIGS. 1 through 5, where similar reference characters denote corresponding features consistently throughout the figures, there are shown preferred embodiments.

FIG. 1 illustrates a system overview to implement a virtual wireless docking host (VWDH) within a dockee in a wireless network.

According to embodiments as disclosed herein. FIG. 1 depicts VWDH implemented in a dockee (that is a dockee device) 101 in the wireless network. The VWDH implemented in the dockee 101 discovers the wireless docking environment device (WDN) 102 and docks the dockee 101 to the discovered WDN 102.

In an embodiment, the VWDH in the dockee 101 can discover and dock to one or more WDNs in the wireless network.

In an embodiment, the dockee 101 discovers the WDN 102 using a discovery protocol. The discovery protocol identifies the WDN 102 with a unique identifier (WDN_ID).

After discovering the WDN 102, the VWDH docks the dockee 101 to the WDN 102 discovered in the wireless network.

In an embodiment, the dockee 101 can dock to one or more peripheral devices in the WDN 102 by using a docking protocol. The docking protocol connects the dockee 101 to one or more peripheral devices in the WDN 102 by using the WDN_ID.

FIG. 2 illustrates the system overview to implement a virtual wireless docking host (VWDH) partially within a dockee and partially within the WDN, according to embodiments as disclosed herein. FIG. 2 depicts the VWDH partially implemented in the dockee 101 and partially implemented in the WDN 102.

As the VWDH is partially implemented in the dockee 101 and partially in the WDN 102, the VWDH functionalities are distributed between the dockee and the peripheral device of the WDN 102.

In an embodiment, the peripheral device implemented with VWDH discovers one or more WDNs by using the WDN-information and the WDN_ID stored in one or more peripheral device in the wireless network.

In an embodiment, the peripheral device implemented with VWDH discovers one or more WDNs on receiving the WDN-information advertised by a proxy device.

In an embodiment, the WDN-information includes properties related to the WDN such as a WDN name, a security related information and the like.

In an embodiment, one of the peripheral devices in the WDN 102 can be configured as the proxy device for the WDN 102. The proxy device contains the WDN-information of all the peripheral devices in the WDN 102. Further, the proxy device advertises the WDN-information of all the peripheral devices in the WDN 102.

Based on the WDN-information received by the dockee 101, the VWDH implemented in the dockee 101 sends a connection request to the discovered WDN 102 to establish a connection between the dockee 101 and the WDN 102.

FIG. 3 illustrates a sequence diagram for establishing a connection between the dockee and the WDN, according to embodiment as disclosed herein.

As depicted in FIG. 3, the dockee 101 can request the peripheral device for the WDN-information along with the WDN_ID of one or more WDNs. Based on the WDN-information received by the dockee 101, the VWDH in the dockee 101 establishes a connection between the dockee 101 and one or more WDNs.

In an embodiment, the dockee 101 discovers one or more WDNs either by discovering a proxy device or by discovering one or more peripheral devices within the wireless network.

The dockee 101 performs (301) device discovery with the peripheral device 102a using a Peer-to-Peer (P2P) device discovery mechanism. Further, receives a success response from the peripheral 102a if the peripheral device is discovered within the WDN. Thereafter, the dockee 101 performs (303) a service discovery by sending a service discovery request to the peripheral device 102a in the wireless network. The discovered peripheral device 102a in the wireless network responds (304) to the request by sending a successful service discovery response message to the dockee 101. Further, the dockee 101 repeats the sequence to perform device discovery (305 and 306) and service discovery (307 and 308) by exchanging messages with the peripheral device 102b.

The dockee 101 performs the service discovery request either by using a Peer-to-Peer (P2P) service discovery mechanism or by using a unified service discovery mechanism.

In an embodiment, the P2P service discovery mechanism sends a service discovery request frame from the dockee 101 to a particular peripheral device in the WDN 102 with service protocol type as "Wi-Fi Docking", and the dockee 101 receives the service discovery response frame from the peripheral device.

In an embodiment, the unified service discovery mechanism sends a multicast service discovery request frame from the dockee 101 to all the peripheral devices in the WDN 102, and the dockee 101 receives the unicast service discovery frame from all the peripheral devices in the WDN 102.

The dockee 101 discovers all the peripherals in one or more WDNs by performing the service discovery request repeatedly.

The service discovery response frame received by the dockee 101 contains the WDN-information along with other peripheral device specific information of the peripheral device. For example, the service discovery response frame contains the P2P discovery related information, the WDN-information, and the Wi-Fi network related information.

After discovering one or more WDNs in the wireless network the dockee 101 displays (309) a list of all the WDNs available in the wireless network, and a user 300 can select (310) one or more WDNs from the list.

In an embodiment, the user 300 can be an administrator or the user assigned with normal privilege to manage the wireless network.

After selecting the WDN from the list, the user initiates a dock request on the dockee 101 and the method enables the dockee 101 to handle the dock request by establishing (311 and 312) a connection between the dockee 101 and the peripheral devices 102*a* and 102*b*.

In an embodiment, the connection is established by sending either a unicast connection request or a multicast join request from the dockee 101 to the WDN 102.

In an embodiment, a unicast connection request is sent to all the peripheral devices in the WDN.

In an embodiment, a multicast join request is sent to one or more WDNs in the wireless network.

Further, the dockee 101 docks (313) with one or more discovered WDNs. While docking the dockee 101 with one or more discovered WDNs, the VWDH implemented in the dockee 101 establishes (314 and 315) required connections with the peripheral device 102*a* and the peripheral device 102*b* for different peripheral function protocols, quality of service (QoS). Further, the dockee 101 initiates the necessary sessions with the peripheral device 102*a* and the peripheral device 102*b*.

In an embodiment, the proxy device advertises the WDN-information and the WDN_ID for the dockee 101. Further, as the dockee 101 receives the WDN_ID advertised by the proxy device, the dockee 101 can establish a connection with the selected WDN.

FIG. 4 illustrates a sequence diagram for configuring and managing the WDN in the wireless network, according to the embodiments as disclosed herein. As depicted in FIG. 4, the method allows the user 300 to add or remove one or more peripheral devices in the WDN 102.

The user 300 sends (401) a request through a configurator device 400 to add or remove one or more peripheral devices in the WDN 102 by using the WDN_ID.

In an embodiment, a configurator device 104 can be the dockee, a browser interface, a software application, or any other device that is capable of configuring one or more WDNs.

As depicted in the FIG. 4, initially the user 300 sends a request to add or remove one or more WDNs in the wireless network. Based on the request sent by the user 300, the configurator device 400 sends (402) a request to add the peripheral device 102*a* by using the WDN_ID and the WDN-information in the WDN 102. The peripheral device 102*a* responds (403) with a success message. The configurator device 400 sends (404) a request to add the peripheral device 102*b* by using the WDN_ID and the WDN-information in the WDN 102. The peripheral device 102*a* responds (405) with a success message. Upon receiving the response from the discovered peripheral device 102*a* and 102*b*, the WDN is configured (406).

In an embodiment, the configurator device 400 is used to configure the proxy device that can store the WDN-information and the WDN_ID of one or more peripheral devices configured in the WDN 102.

In an embodiment, the user 300 can configure each peripheral device in the WDN to store the WDN-information of all the peripheral devices in the WDN. For example, the peripheral device 102*a* can store the WDN-information of the peripheral device 102*b*, and the peripheral device 102*b* can store the WDN-information of the peripheral device 102*a*. Storing the WDN-information in each peripheral device enables the dockee to discover the WDN more efficiently.

In another embodiment, the WDN-information of one or more WDNs in the wireless network can be stored on a cloud-based application or any other application. Further, the dockee 101 can retrieve the WDN-information stored on the cloud-based application or the application at any point in time.

FIG. 5 illustrates a computing environment implementing the virtual wireless docking host (VWDH) within the dockee, according to embodiments as disclosed herein.

As depicted the computing environment 501 comprises at least one processing unit 504 that is equipped with a control unit 502 and an Arithmetic Logic Unit (ALU) 503, a memory 505, a storage unit 506, plurality of networking devices 508 and a plurality Input output (I/O) devices 507. The processing unit 504 is responsible for processing the instructions of the algorithm. The processing unit 504 receives commands from the control unit in order to perform its processing. Further, any logical and arithmetic operations involved in the execution of the instructions are computed with the help of the ALU 503.

The overall computing environment 501 can be composed of multiple homogeneous and/or heterogeneous cores, multiple Central Processing Units (CPUs) of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 504.

In case of any hardware implementations various networking devices 508 or external I/O devices 507 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 5 include blocks which can be at least one of a hardware device, or a combination of hardware device and software module. In one embodiment, the WDN 102 can be implemented to include a processing unit and a memory storing at least one instruction to control the processing unit.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for docking by a virtual wireless docking host (VWDH) in a wireless network including a wireless docking environment (WDN) including a plurality of peripheral devices, the method comprising:
    transmitting, by a dockee, to at least one additional peripheral device, a request of addition of the at least one additional peripheral device in the WDN by using a WDN identifier (ID);
    receiving, by the dockee, from the at least one additional peripheral device, a response for configuring the WDN;
    discovering, by the VWDH, implemented within the dockee, the WDN within the wireless network;
    receiving, by the VWDH, WDN information of the plurality of peripheral devices in the WDN, wherein the WDN information includes security information and the WDN ID; and
    docking, by the VWDH, to the plurality of peripheral devices in the WDN based on the WDN information,
    wherein the WDN information is advertised by a proxy device, which is one of the plurality of peripheral devices other than the dockee, and the WDN information is stored in the plurality of peripheral devices in the WDN, and
    wherein docking by the VWDH comprises establishing connections with the plurality of peripheral devices based on function protocols of the plurality of peripheral devices.

2. The method as in claim 1, further comprising:
    managing the WDN by performing at least one of the addition of the at least one additional peripheral device to the WDN and removal of at least one of the plurality of peripheral devices from the WDN.

3. The method as in claim 2, further comprising:
    storing configuration information of the managed WDN in at least one of the plurality of peripheral devices in the WDN, wherein the configuration information comprises the WDN information of the managed WDN.

4. The method as in claim 3, wherein the configuration information of the managed WDN is stored in the proxy device.

5. The method as in claim 1, further comprising:
    identifying the WDN using the WDN ID.

6. The method as in claim 1, wherein docking comprises:
    sending a dock request to the plurality of peripheral devices in the WDN; and
    docking with the plurality of peripheral devices by using the WDN information of the WDN.

7. An apparatus of a virtual wireless docking host (VWDH) for docking in a wireless network including a wireless docking environment (WDN) including a plurality of peripheral devices, the apparatus comprising:
    a processor configured to
        transmit, to at least one additional peripheral device, a request of addition of the at least one additional peripheral device in the WDN by using a WDN identifier (WDN ID), and
        receive from the at least one additional peripheral device a response for configuring the WDN; and
    wherein the VWDH is configured to
        discover the WDN within the wireless network;
        receive WDN information of the plurality of peripheral devices in the WDN, wherein the WDN information includes security information and the WDN ID; and
        dock to the plurality of peripheral devices in the WDN based on the WDN information,
    wherein the WDN information is advertised by a proxy device, which is one of the plurality of peripheral devices other than the apparatus, and the WDN information is stored in the plurality of peripheral devices in the WDN, and
    wherein docking by the VWDH comprises establishing connections with the plurality of peripheral devices based on function protocols of the plurality of peripheral devices.

8. The apparatus as in claim 7, wherein the processor is further configured to:
    manage the WDN by performing at least one of the addition of the at least one additional peripheral device to the WDN and removal of at least one of the plurality of peripheral devices from the WDN.

9. The apparatus as in claim 8, wherein the processor is further configured to:
    store configuration information of the managed WDN in at least one of the plurality of peripheral devices in the WDN, wherein the configuration information comprises the WDN—information of the managed WDN.

10. The apparatus as in claim 9, wherein the configuration information of the managed WDN is stored in the proxy device.

11. The apparatus as in claim 7, wherein the processor is further configured to:
    identify the WDN using the WDN ID.

12. The apparatus as in claim 7, wherein the VWDH is further configured to:
    dock with the WDN by sending a dock request to the plurality of peripheral devices in the WDN; and
    dock with the plurality of peripheral devices by using the WDN information of the WDN.

* * * * *